United States Patent
Janins et al.

(10) Patent No.: US 9,778,471 B2
(45) Date of Patent: Oct. 3, 2017

(54) METHOD AND DEVICE FOR PRODUCING MULTI-VIEW IMAGES AND OPTICAL FILM USED IN SAID METHOD AND DEVICE

(75) Inventors: Boriss Janins, Riga (LV); Jurijs Antonovs, Riga (LV)

(73) Assignee: SLICKER SIA, Riga (LV)

(*) Notice: Subject to any disclaimer, the term of this patent is extended or adjusted under 35 U.S.C. 154(b) by 6 days.

(21) Appl. No.: 14/387,211

(22) PCT Filed: Mar. 22, 2012

(86) PCT No.: PCT/LV2012/000004
§ 371 (c)(1),
(2), (4) Date: Sep. 22, 2014

(87) PCT Pub. No.: WO2013/141682
PCT Pub. Date: Sep. 26, 2013

(65) Prior Publication Data
US 2015/0049383 A1 Feb. 19, 2015

(51) Int. Cl.
*G02B 27/22* (2006.01)
*G02B 3/00* (2006.01)
*H04N 13/04* (2006.01)

(52) U.S. Cl.
CPC ....... *G02B 27/2214* (2013.01); *G02B 3/0068* (2013.01); *H04N 13/0404* (2013.01); *H04N 13/0406* (2013.01)

(58) Field of Classification Search
CPC .. G02B 27/2214; G02B 3/0068; G02B 27/22; G02B 3/00; H04N 13/0404; H04N 13/0406
USPC ................................ 359/463, 20, 489.18
See application file for complete search history.

(56) References Cited

U.S. PATENT DOCUMENTS

| | | | | |
|---|---|---|---|---|
| 3,312,006 A | * | 4/1967 | Rowland | B44F 1/10 359/542 |
| 5,202,793 A | | 4/1993 | Auge | |
| 5,359,454 A | * | 10/1994 | Steenblik | B29C 39/026 359/463 |
| 5,546,120 A | | 8/1996 | Miller et al. | |

(Continued)

FOREIGN PATENT DOCUMENTS

| | | |
|---|---|---|
| GB | 541753 A | 12/1941 |
| JP | 2006162666 | 6/2006 |

(Continued)

OTHER PUBLICATIONS

Hembd-Solner et al. "Imaging properties of the Gabor Superlens" J. Opt. A: Pure Appl. Opt. vol. 1 pp. 94-102, 1999.*

(Continued)

*Primary Examiner* — Jordan Schwartz
*Assistant Examiner* — George G King
(74) *Attorney, Agent, or Firm* — Smartpat PLC (57) ABSTRACT

A method and a device for producing multi-view images optical films used therein are disclosed. The method and device use an optical film 2, comprising a superlens array 3 with between 0.5 to 225 superlenses per inch, formed by two arrays of positive microlenses which are fixed relative to one another. In order to produce a multi-view image 1 between a viewer 11 and the optical film 2, an array 10 of elemental images is arranged between the focal plane 9 of the superlenses 3 and the optical film 2.

16 Claims, 5 Drawing Sheets

(56) References Cited

U.S. PATENT DOCUMENTS

| | | | |
|---|---|---|---|
| 6,128,054 A * | 10/2000 | Schwarzenberger | G02F 1/13336 |
| | | | 348/E5.144 |
| 6,469,830 B1 * | 10/2002 | Dubin .................. | G03B 21/625 |
| | | | 359/449 |
| 7,457,039 B2 | 11/2008 | Raymond et al. | |
| 7,643,719 B1 * | 1/2010 | Zhou .................... | G02B 3/0087 |
| | | | 385/129 |
| 2009/0273834 A1 * | 11/2009 | Korenaga ............ | G02B 5/1885 |
| | | | 359/463 |
| 2011/0134040 A1 | 6/2011 | Duparre et al. | |

FOREIGN PATENT DOCUMENTS

| | | |
|---|---|---|
| KR | 100860611 B1 | 9/2008 |
| KR | 100901866 | 6/2009 |

OTHER PUBLICATIONS

David E. Roberts and Trebor Smith. "The History of Integral Print Methods. An excerpt from: 'Lens Array Print Techniques'". Unknown publication date. Retrieved from http://lenticulartechnology.com/files/2014/02/Integral-History.pdf on Jun. 9, 2017.

* cited by examiner

METHOD AND DEVICE FOR PRODUCING MULTI-VIEW IMAGES AND OPTICAL FILM USED IN SAID METHOD AND DEVICE

TECHNICAL FIELD

The present invention relates to a method and a device for producing multi-view images, in particular large-format multi-view images, and to optical films used in this method and device. The invention may be used in indoor and outdoor advertising, visual art, in decoration of interior and facade of buildings, and in photo and video apparatus, including television and computer displays, simulators, video games and in special need monitors for medicinal, engineering, research and other purposes.

BACKGROUND

The modern method for producing multi-view images on the basis of integral Lippmann photography provides that several views (usually starting with 12) of a 3D object or a scene are taken by one or several photo apparatuses from several points by the aid of computer are cut into narrow strips and alternates in inverted order with the period equal to a lenticular pitch. Plastic film with lenticular lens array is usually used as lens pattern. At present this method is broadly spread due to the computer synthesis of elemental images array, the development of means of high-resolution print and the progress in producing of high-pitch microlens arrays in the form of optical films and plastic sheets.

Disadvantages of this method are rather low resolution and a small depth of field of multi-view images, and the requirement of extreme accuracy to align the pitch of lenticular lens and elemental images array, and proportional increase of consumption of optical materials when manufacturing lens arrays with the lens elements of larger size. The number of lens elements per inch in optical films used for producing multi-view images should be at least 12 times less than the number per inch of separately discernible elements in elemental images. For example, in order to produce a high quality multi-view image by microlens array with the number of lens elements per inch equal to 200, a resolution of elemental images output device shall be approximately 6000 points per inch. Superposition accuracy of elemental images and microlens array shall not exceed 1/200 inch. At present these requirements are difficult to implement.

There is known the method for producing multi-view image described in U.S. Pat. No. 7,457,039, wherein at an outer side of a wall of an optically transparent container, for example, plastic packaging, the optical film is arranged that comprises an array of positive lenticular lenses with the period mainly from 70 to 20 microlens per inch, and at the opposite side of the wall of the optically transparent container the elemental images array is arranged in such a way that focal points of each of the microlenses are situated at the same distance from the surface of optical film that an interlaced image is (elemental image array analogue), or in close proximity to it. Due to the substitution of a part of the thickness of the optical film for optically transparent material this method allows decreasing the thickness of the optical film not increasing the number of microlenses per inch.

The disadvantage of the known method is the increase of visibility of lens elements for a viewer in proportion to the decrease of the number of microlenses per inch, and the dependency relation between the thickness of the optical film and relationship of the number of microlenses and a microlens curvature R, that does not allow increasing the size and the viewing angle in wide range without a proportional increase of the thickness of the optical film.

One of a possible solution may be a substitution of convex lens elements for plane substitutes thereof, for example, by Fresnel lenses that allows increasing in a wider range the size of lens elements not increasing the thickness of the optical film. However, the multi-view image created with the use of Fresnel lens array looks segmented one, and the boundaries between separate lens elements of an array are well seen for a viewer.

A superlens, a principle of creation of which is described by Gabor in the patent GB541753A, as well as Fresnel lens, is a plane substitute of a convex lens. One of the main features of Gabor superlenses compared to other plane lenses is that there are no well-defined boundaries in the superlens array between separate superlenses—they gradually change from one to another. The disadvantage of superlens array described in GB541753A, when used instead of convex lens array for producing multi-view images, is that at a significant decrease of focal length of superlenses obtained by a focal superposition of two arrays of spherical or cylindrical microlenses, a spherical aberration and light transmittance irregularity in a paraxial and peripheral regions of the superlenses are increased. This makes separate superlenses more noticeable for a viewer, and result in quality degradation of the multi-view image.

In GB541753A described are the variants of creation of superlenses with decreased spherical aberration. One of the variant of creation of superlenses with decreased spherical aberration described in GB541753A, comprises afocal superposition of two cylindrical (lenticular) or spherical (fly-eye) microlenses made of optically transparent materials with essentially different refractive indices. The disadvantage of this variant is that two different optical materials with maximum and minimum refractive indices, and additional adhesive layers shall be used, for superposition of these materials. The method of manufacturing such a film is expensive and technically complex one. Another variant involves the use of aplanatic microlens arrays for creation of superlenses. This requires additional optical layers in both microlens arrays that is difficult to implement from technical point of view. Another variant of decrease of spherical aberration involves superlens diaphragming. Diaphragming is not desirable because a noticeability of separate superlenses for a viewer is increased.

SUMMARY

A technical problem that is solved by the present invention is a possibility of essential increase of the size of elemental images, a possibility of decrease of elemental image resolution, more simple use of additional superlens arrays of elemental images, decrease of noticeability for a viewer of lens elements of the optical film, and the decrease of consumption of the optical material when manufacturing the optical film.

According to the present invention the method and device of producing a multi-view image uses an optical film comprising a superlens array formed by two arrays of positive microlenses. The arrays of positive microlenses consist of optically transparent material, which are fixed relative to one another, or of optical analogs of positive microlenses. In at least one direction along the surface of the optical film the number of superlenses ranges from 0.5 to 225 per inch. In the focal plane of each of the superlenses or equidistant to the surface of the optical film at a distance from the focal plane of each of the superlenses, which is smaller than the focal distance of each of the superlenses, an array of static or dynamic elemental images is arranged, wherein the arrangement and the number of elemental images per inch preferably corresponds to the arrangement and the number of superlenses per inch in the same direction.

In case the elemental image array is arranged equidistant to the surface of the optical film at a distance not larger than the focal distance of superlenses, a multi-view image is formed in the region between a viewer and the optical film (in a real image field).

In case the elemental image array is arranged equidistant to the surface of the optical film at a distance exceeding the focal distance of superlenses and not exceeding the double focal distance of superlenses (at a distance from focal plane of each of the superlenses, which is smaller than focal distance of each of the superlenses, but away from the optical film), multi-view image is formed relative to a viewer of the surface of the optical film (in the virtual image field).

In both cases described above the multi-view image resolution will be comparable to the resolution of elemental images.

In case an elemental image array is arranged on a focal plane of the optical film, the multi-view image is formed in both said regions with the resolution corresponding to the number of superlenses per inch, i.e. from 0.5 to 225 lines (or points in case of fly-eye superlenses) per inch.

In practice, if the number of superlenses in the optical film is from 225 to 10 per inch including, it is reasonable to arrange an elemental image array on a focal plane of the optical film.

The optical film with the number of superlenses essentially less than 10 per inch suggests arranging the array of elemental images equidistant to the surface of the optical film at a distance from the focal plane of the optical film, which is smaller than the focal distance of each of the superlenses.

The number of superlenses in the optical film lies within the range from 0.5 to 225 per inch. The less the number of superlenses the greater may be the size of each of the elemental image. Maximum tolerance to align them and superlens array increases. The lower limit—0.5 superlenses per inch—is determined by an average distance between human eyes that is 6.5 cm. In this case optical axes of viewer eyes watching on infinitely distant object will always go through two superlenses that is the necessary condition for full perception of a multi-view image when viewed from a close distance. The upper limit—225 superlenses per inch—is determined by the limitation of resolution of common printers (approximately 2000 lines per inch).

The optical film in a simplest embodiment may comprise linear (lenticular) superlenses arranged in one direction along the surface of the optical film. This allows producing a multi-view image with a horizontal parallax.

The optical film may comprise 2D array of fly-eye superlenses arranged in two directions along the surface of the optical film. This allows producing a multi-view image with a full parallax.

An elemental image array is arranged on a medium of elemental images. The elemental image medium may be a sheet of a transparent or nontransparent material, a surface or a device suitable for mechanical or manual application, printing or reproduction of static or dynamic images array by any known method. Elemental image medium may be a sheet of paper, plastic, cardboard, film or any other material used for printing. The use of a sheet of paper or a film as a medium for elemental images is simple and economic one because of availability of these materials and a printing technique. A sheet of paper or a film may have adhesive properties that essentially simplify its placing. Elemental image medium may be a liquid crystal display, organic light emitting display, surface-conduction emission display (LCD, OLED, SED) or any other display.

Between the optical film and the array of static or dynamic elemental images, in a focal plane of each of superlenses of the optical film or equidistant to the surface of the optical film at a distance from a focal plane of each of superlenses, which is smaller than a focal distance of each of the superlenses on at least partially optically transparent media there may be arranged at least one additional array of static or dynamic elemental images, in which the arrangement and the number of elemental images per inch preferably corresponds to the arrangement and the number of superlenses per inch in the same direction.

The additional arrays of elemental images may be arranged on any at least partially transparent medium: a sheet of optically transparent material or a film, and on any device suitable for the arrangement of an array of additional static or dynamic elemental image by any known method. The medium of additional elemental images may be an optically transparent one: a liquid crystal display, organic light emitting display, surface-conduction emission display (LCD, OLED, SED) or any other optically transparent display.

The placing of one or an additional medium of elemental images is possible, however, the number of additional media of elemental images is limited by a double focal distance of superlenses of the optical film, within which they may be arranged, and by the thickness of displays. The larger the number of additional arrays of elemental images is arranged within the range of a double focal distance of superlenses of the optical film, the larger depth of field a multi-view image will have.

The optical film may be placed on optically transparent substrate with the thickness from 0.005 to 7 inches. The optical film may be manufactured for further placing on optically transparent substrates such as glass, glass units, organic glass, plastic sheets and other transparent materials with consideration for standards of thickness and refractive index. In this case a focal instance of superlenses of the optical film shall be selected with consideration of thickness and refractive index of optically transparent substrate, on which the optical film is supposed to be placed. The placing of the optical film and elemental image array on prefabricated constructions essentially decreases the cost of producing qualitative large-format multi-view images.

For implementing the method for producing a multi-view image use is made of the optical film with the thickness from 0.5 to 30 mil, which contains superlens array, formed by two fixed relative one another preferably identically oriented arrays of positive microlenses of optically transparent material or optical substitutes of positive microlenses, the number of which in the first array at least in one direction along the surface of the optical film is 100-2250 per inch, and in the second array the number of positive microlenses or optical substitutes of positive microlenses per inch is greater by the value from 0.5 of positive microlenses or optical substitutes of positive microlenses per inch, to $\frac{1}{10}$ of the number of positive microlenses or optical substitutes of positive microlenses per inch in the first array, while an aperture angle α of positive microlenses or optical substitutes of positive microlenses in the second array is not less than 7°.

The thickness of optical film is from 0.5 to 30 mil (1 mil is equal to $1/1000$ inches), that makes convenient its use, storage and transport, and makes its manufacturing economic one.

If the difference between the number of positive microlenses or optical substitutes of positive microlenses in the first and second arrays is from 0.5 per inch to $1/10$ of the number of positive microlenses or optical substitutes of positive microlenses per inch in the first array then the superlens array is created with the number of superlenses per inch not exceeding $1/10$ of the number of positive microlenses or optical substitutes of positive microlenses per inch in the first array.

Superlenses with said parameters are maximum effective ones in producing multi-view images and have optimal relationship between the thickness of optical film and superlens aperture.

Optical substitutes of positive microlenses are any elements fulfilling the functions of positive microlenses, for example, a parallax barrier, a pinholes array, etc.

As the viewing angle of multi-view image is minimum acceptable one beginning from 14°, the aperture angle of superlenses shall be not less than 7°.

At present the production of arrays of positive lenticular aspherical microlenses with the number up to 2250 microlenses per inch (period 2250 LPI) is not a technically complicated problem. The optical film complying with all necessary parameters may be manufacture on existing equipment.

The optical film may comprise superlens arrays or optical substitutes thereof, in which the aperture angle β of positive microlenses or optical substitutes of positive superlenses of the first array is larger than the aperture angle α of positive microlenses or optical substitutes of positive microlenses of the second array and their relationship is described by the formula $β=aα^2+b$, where $0.06≤a≤0.08$ and $11≤b≤15$. Experience has shown that the described relationship allows maximally decreasing spherical aberration of short-focus superlenses, lowering blinks of optical film, removing light transmission irregularity in paraxial and peripheral regions of superlenses and making multi-view image less segmented without the use aplanatic systems, diaphragming, and also the use in the optical film the materials with essentially different refractive indices. Decreasing spherical aberration of superlenses improves the visual quality and increases depth of field (DOF) of a multi-view image.

In the optical film the number of positive microlenses or optical substitutes of positive microlenses in the first array of positive microlenses or optical substitutes of positive microlenses at least in one direction may be from 200 to 500 per inch. Definition of human eyes is approximately 30 arcseconds. Correspondingly, in order that microlenses forming a superlens do not prevent the comfort perception of a multi-view image their angle size shall not exceed 30 arcseconds. At a distance of viewing of 30 centimeters a threshold of detection is 500 lines per inch. At a viewing distance of one meter a threshold of detection is approximately 200 lines per inch.

The optical film may comprise at least one array of positive microlenses with aspherical refracting surfaces. Aspherical positive microlenses, preferably with elliptical refractive surface, allow obtaining short-focus superlenses with the decreased spherical aberration.

The optical film may comprise the arrays of positive lenticular microlenses. The arrays of positive lenticular microlenses form the arrays of lenticular superlenses. The optical film comprising an array of positive lenticular microlenses is the most simple and effective variant of the optical film for implementing the proposed method for producing multi-view images.

The optical film may comprise 2D arrays of positive microlenses or optical substitutes of positive microlenses forming a fly-eye structure. The use of 2D arrays of positive microlenses or optical substitutes of positive microlenses, forming a fly-eye structure, allows obtaining 2D array of fly-eye superlenses. In turn, the use of 2D arrays of elemental images identically arranged allows producing multi-view images with full parallax.

In the optical film at least one array of plano-convex positive microlenses of optically transparent material may be oriented by a flat side out the optical film. One of necessary conditions for superlens forming is the alignment of focal surfaces of the positive microlenses of the first and the second arrays. Plano-convex positive microlenses have two focal planes, rear and front ones. In this regard they may be aligned in such a way that one or both sides of the optical film will have a smooth, flat surface. Such an alignment is technically more sophisticated than the alignment of positive microlens arrays with their plane sides to one another, and allows applying adhesive elements on a smooth surface of the optical film without essential deterioration of optical parameters of superlenses.

At least one side of optical film may have a smooth surface formed by the coating layer of optically transparent material applied onto the positive microlens array or the array of optical substitutes of positive microlenses, while the difference between refractive indices of the optical film material and optically transparent material of coating layer is not less than 0.15. In case of coating of a convex surface of positive microlenses of the optical film by a layer of optically transparent substance or a mixture in order to receive a smooth surface of the optical film and/or coating of adhesive, protective or any other layer with useful properties, said difference between refraction indices of the coating layer and optical material of microlenses of the optical film (not less than 0.15) is necessary to preserve maximum optical power of microlenses.

The optical film may be self-adhesive. The optical film with adhesive properties may be arranged on optically transparent substrate without the use of any additional means. This may be achieved when manufacturing the optical film by the use of static-cling materials by the application of adhesive layers onto the surface of the optical film, and by any other methods and technologies, which do not significantly deteriorate optical properties of the optical film.

The surface of the optical film may have an adhesive layer for fixing of the optical film to the surface of optically transparent substrate applied in a regular pattern, total coating area of which does not exceed 25% of the surface area of the optical film. The limitation of 25% coating area of the surface area of the optical film is necessary to preserve acceptable visual characteristics of a multi-view image. The regular pattern, including randomly arranged points with identical distribution density, may fulfill the function of a filter, not causing essential negative effect on visual quality of multi-view image. An adhesive layer in the form of the regular pattern may consist both of optically transparent and nontransparent material, including the material colored in various colors, among other white, black or grey ones. The regular pattern, in the form of which the adhesive layer is applied, may contribute to increase the depth of field of a multi-view image and/or to decrease a segmentation of multi-view image.

BRIEF DESCRIPTION OF THE DRAWINGS

The present invention will be described below with reference to preferable embodiments not being the only possible ones and shown in the accompanying drawings, in which:

FIG. 7 (a-g) show embodiments (sectional view) of the optical film for the implementing the method for producing a multi-view image;

DETAILED DESCRIPTION

Example 1

Figure 1:
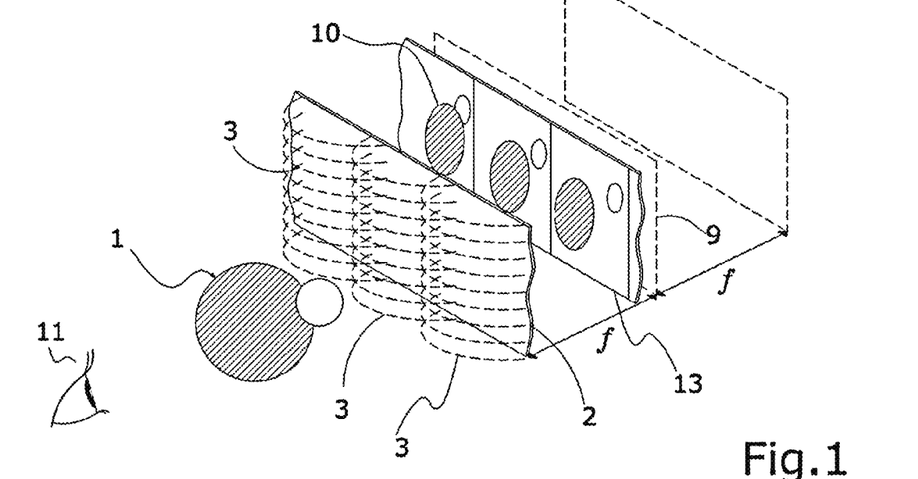
FIG. 1 shows a schematic diagram of implementing the method for producing multi-view image with the use of one elemental image array.

FIG. 1 shows a schematic diagram of implementing the method for producing a multi-view image 1, wherein the use is made of the optical film 2, comprising superlens array 3 formed by fixed relative to one another two arrays 4,5 of positive microlenses 6,7 (not shown in FIG. 1) of optically transparent material or optical substitutes 8 of positive microlenses 6,7 (not shown in FIG. 1), wherein in at least one direction along the surface of the optical film 2 the number of superlenses 3 is from 0.5 to 225 per inch, and in a focal plane 9 of each of the superlenses 3 or equidistant to the surface of the optical film 2 at a distance from the focal plane 9 of each of the superlenses 3, which is smaller than the focal distance f of each of the superlenses 3 there is arranged an array 10 of static or dynamic elemental images, wherein the arrangement and the number of elemental images per inch preferably corresponds to the arrangement and the number of superlenses 3 per inch in the same direction. For producing the multi-view image 1 between a viewer 11 and the optical film 2, the elemental image array 10 is arranged between the focal plane 9 of superlenses 3 and the optical film 2.

For producing the multi-view image 1 behind the optical film 2 relative to the viewer 11 (this embodiment is not shown in FIG. 1), elemental image array 10 may be arranged behind the focal plane 9 of superlenses 3, no further than the double focal distance f of superlenses 3. The multi-view image 1 resolution in both embodiments will be comparable with the elemental image array 10 resolution.

When the elemental image array 10 is arranged in the focal plane 9 of superlenses 3 (this embodiment is not shown in FIG. 1), the multi-view image 1 is formed in both said regions. In this embodiment the multi-view 1 resolution will be essentially less than the elemental image array 10 resolution. These three embodiments of arrangement may be used for all further examples of the method for producing the multi-view image and are not shown in figures because of the variety of possible combinations.

Example 2

Figure 2:
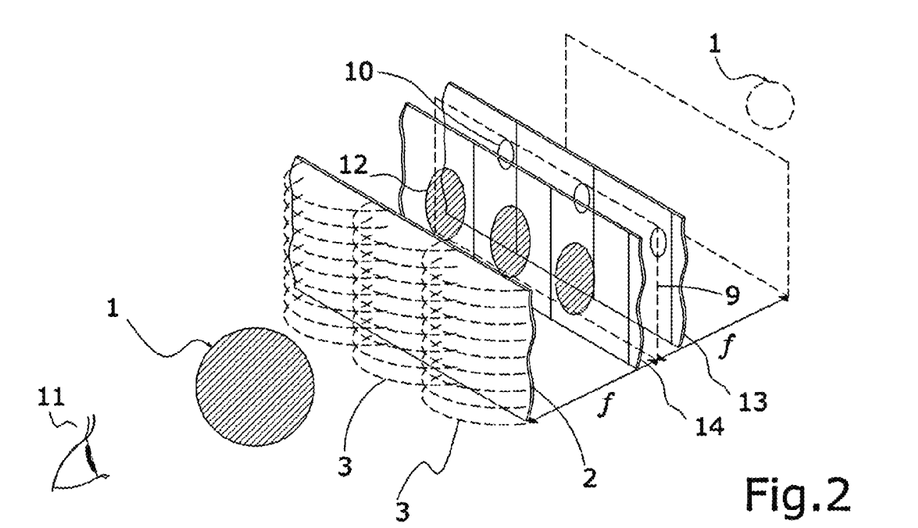
FIG. 2 shows a schematic diagram of implementing the method for producing multi-view image with the use of one additional elemental image array.

FIG. 2 shows a schematic diagram of implementing the method for producing the multi-view image 1, wherein between the optical film 2 and the array of static or dynamic elemental images 10, in the focal plane 9 of each of the superlenses 3 of the optical film 2 or equidistant to the surface of the optical film 2 at a distance from the focal plane 9 of each of the superlenses 3, smaller than the focal distance 9 of each of the superlenses 3, on at least partially optically transparent additional medium 14 there is arranged at least one additional array 12 of static or dynamic elemental images, wherein the arrangement and the number of elemental images per inch preferably corresponds to the arrangement and the number of superlenses 3 per inch in the same direction. The number of in-focus zones of the multi-view image 1 in this example will be increased in proportion with the number of additional elemental image arrays 12.

Figure 3:
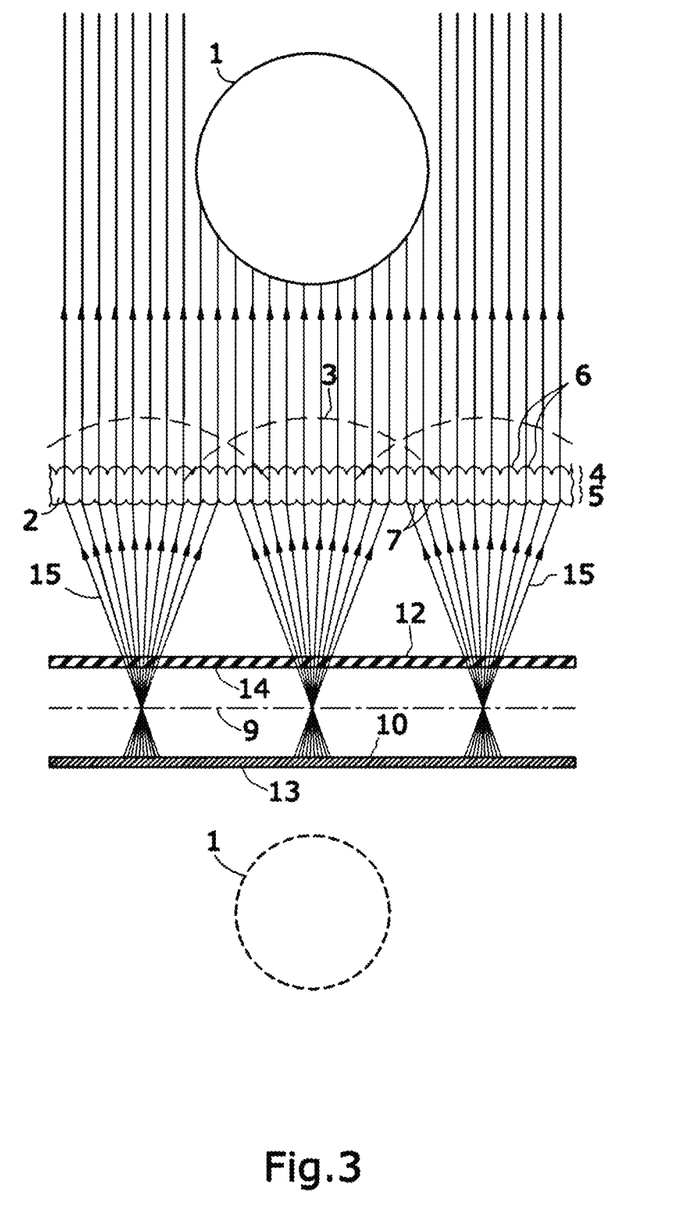
FIG. 3 shows light beams in the implementing the method for producing a multi-view image in FIG. 2.

FIG. 3 shows the reverse of light beams 15, passing from the medium 13 of elemental image array 10 through the optically transparent additional medium 14 of the additional elemental image array 12 and the optical film 2, comprising the arrays 4,5 of positive microlenses 6,7, forming superlenses 3. Light beams 15 produce the multi-view image 1 in the real image field and in the virtual image field (shown as a dashed line). The focal plane 9 of superlenses 3 is arranged between the elemental image array 10 and the additional elemental image array 12.

Example 3

Figure 4:
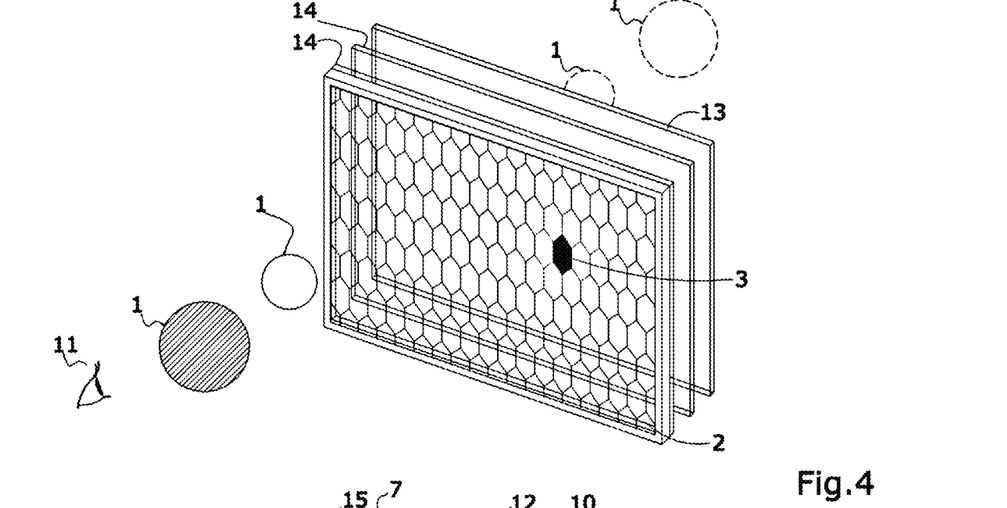
FIG. 4 shows a schematic diagram of an autostereoscopic display implementing the method for producing a multi-view image with two additional arrays of elemental images.

FIG. 4 shows a schematic diagram of the autostereoscopic display, which implements the method for producing multi-view image 1, with the use of more than one additional elemental image array 12 (not shown in FIG. 4). The display produces qualitative static or dynamic multi-view image 1 with three in-focus zones—for far-distance, mid-distance and close-up views, and may operate in 2D mode. The medium 13 of elemental image array 10 (not shown in FIG. 4) is arranged at a distance not exceeding the double focal distance f of superlenses 3 of the optical film 2 from the side of the focal plane of superlenses 3. Between the medium 13 of elemental images 10 and the optical film 2, there are arranged two additional media 14 of elemental images 12, representing optically transparent displays. Furthermore, one medium 14 of dynamic elemental images 12 is arranged in a close proximity or close to the optical film 2. The multi-view image 1 is produced in the region between the viewer 11 and the optical film 2 and in the region behind the surface of the optical film 2 relative to the viewer 11.

Figure 5:
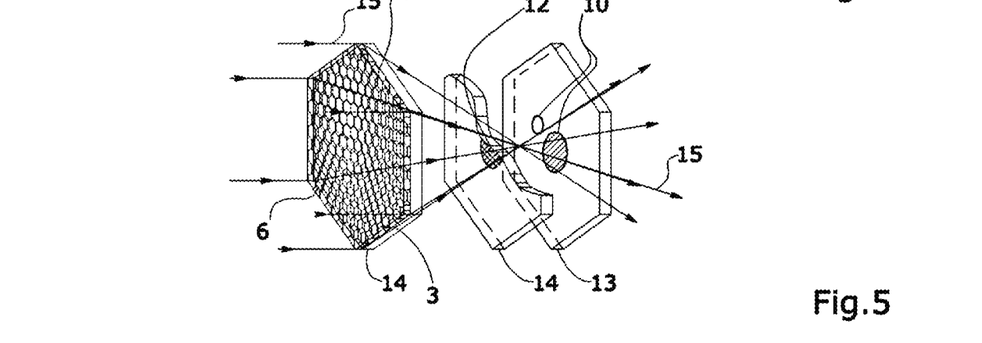
FIG. 5 shows a schematic diagram of the element of the autostereoscopic display, which implements the method for producing a multi-view image with two additional arrays of elemental images.

FIG. 5 schematically shows a fragment of a corresponding region of one of the fly-eye superlenses 3, and light beams 15 in this fragment. Light beams 15, which pass through the optical film 2 and through additional transparent media 14 of elemental images 12, are focused at the focal plane 9 (not shown in FIG. 5) of the fly-eye superlens 3.

The examples of embodiment of the optical film for implementing the proposed method for producing multi-view image are given below.

Example 4

Figure 6:
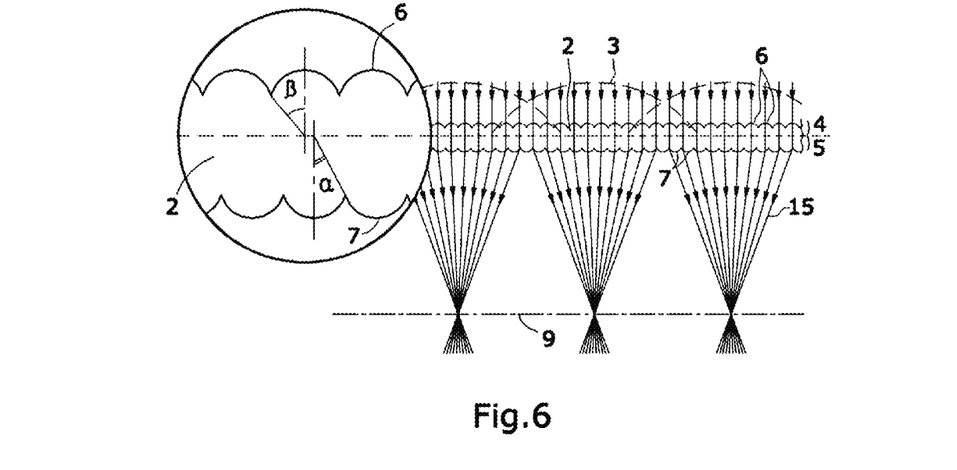
FIG. 6 shows the simplest embodiment of the optical film used for implementing the method for producing multi-view images and light beams therein.

FIG. 6 shows the simplest embodiment of the optical film 2 used for implementing the method for producing multi-view images, and light beams 15 therein. The thickness of the optical film 2 is from 0.5 to 30 mil. The optical film 2 comprises superlens 3 array formed by two fixed relative to one another preferably identically oriented arrays 4,5 of positive microlenses 6,7 made of optically transparent material or optical substitutes 8 (not shown in FIG. 6) of positive microlenses, aligned by focal planes. The number of microlenses 6 in the first array 4 at least in one direction along the surface of the optical film 2 is from 100 to 2250 per inch, and in the second array 5 the number of positive microlenses 7 or optical substitutes 8 (not shown in FIG. 6) of positive microlenses per inch is greater by a value from 0.5 of the number of positive microlenses 6, 7 or optical substitutes 8 (not shown in FIG. 6) of positive microlenses per inch, to $\frac{1}{10}$ of the number of positive microlenses 6 or optical substitutes 8 (not shown in FIG. 6) of positive microlenses per inch in the first array 4, while an aperture angle $\alpha$ of positive microlenses 7 or optical substitutes 8 (not shown in FIG. 6) of positive microlenses in the second array 5 is not less than 7°.

FIG. 6 shows light beams 15, which are identical to all further of embodiments the optical film 2. For the purposes of simplicity shown are only such light beams 15, which are parallel to each other and pass through the centre of microlenses 6 of the first array 4. Within the double focal distance f of superlenses 3 there may be arranged the array of elemental images 10 and one or several arrays of additional elemental images 12 (not shown in FIG. 6).

The preferable variant of the described example is the optical film 2, wherein the number of microlenses 6 in the first array 4 in at least one direction along the surface of the optical film 2 is from 200 to 500 per inch. The number of superlenses 3 of the optical film 2 may be from 0.5 to 200 per inch.

Example 5

A particular embodiment of the optical film 2 is the one, wherein positive microlenses 6 of the first array 4 have aspherical refracting surface. All following embodiments of the optical film may comprise at least one array of lens elements with aspherical refractive surface.

Figure 7:
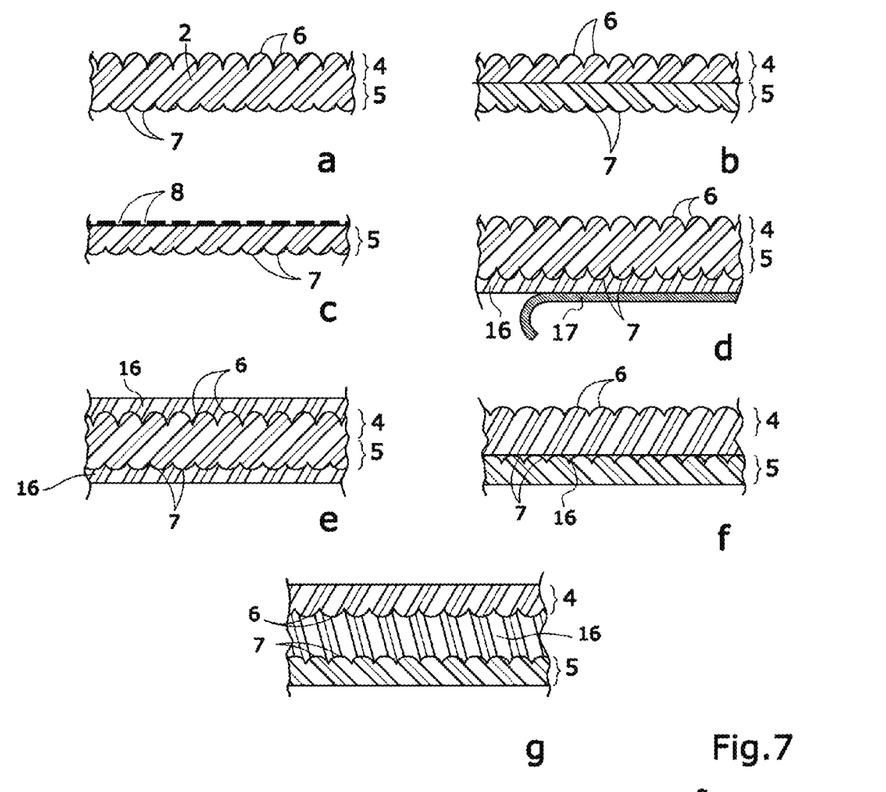

FIG. 7a shows the optical film 2, wherein positive microlenses 6 of the first array 4 have aspherical refracting surface. The optical film 2 comprises arrays 4,5 of positive lenticular microlenses 6,7, while the aperture angle $\beta$ of positive microlenses 6 of the first array 4 is larger than the aperture angle $\alpha$ of positive microlenses 7 of the second array 5, and their relationship is described by the formula $\beta=a\alpha^2+b$, where $0.06 \le a \le 0.08$ and $11 \le b \le 15$. The number of positive microlenses 6 in the first array 4 in at least one direction is from 200 to 500 per inch. Microlens arrays 4,5 may be applied onto optically transparent film 2 by extrusion, or made by any other method, which ensures sufficient accuracy.

Example 6

FIG. 7b shows the embodiment of the optical film 2 in the form of a composite optically transparent film comprising microlens arrays 4,5. Microlenses 6,7 of the first array 4 and the second array 5 may be made of the materials with different refractive indices.

Example 7

FIG. 7c shows the embodiment of the optical film 2, comprising the array 5 of microlenses 7, and the array of optical substitutes 8 of positive microlenses in the form of parallax barrier.

Example 8

FIG. 7d shows the embodiment of a self-sticking optical film 2, comprising microlens arrays 6,7. While the second array 5 of microlenses 7 is coated by a layer 16 of optically transparent substance or a mixture with adhesive properties, and by a protective film 17.

Example 9

FIG. 7e shows the embodiment of the optical film 2, both sides of which have a smooth surface formed by the layer 16 of optically transparent substance or a mixture applied onto microlens arrays 4,5, while the difference between the refractive indices of the material of optical film 2 and optically transparent substance or a mixture of the coating layer 16 is not less than 0.15.

Example 10

FIG. 7f shows the embodiment of the optical film 2 with the layer 16 of optically transparent substance or a mixture, wherein one array 5 of positive microlenses 7 made of optically transparent material is oriented by a plane side out the optical film 2, wherein refracting surfaces of microlenses 7 of the lower array 5 are faced inwards the optical film 2.

Example 11

FIG. 7g shows the embodiment of the optical film 2 with the layer 16 of an optically transparent substance or a mixture, wherein the arrays 4,5 of positive microlenses 6,7 made of optically transparent material are oriented by a plane side out the optical plane 2, wherein refracting surfaces of microlenses 6,7 of the first and the second array 4,5 are faced inwards the optical plane 2.

Example 12

Figure 8:
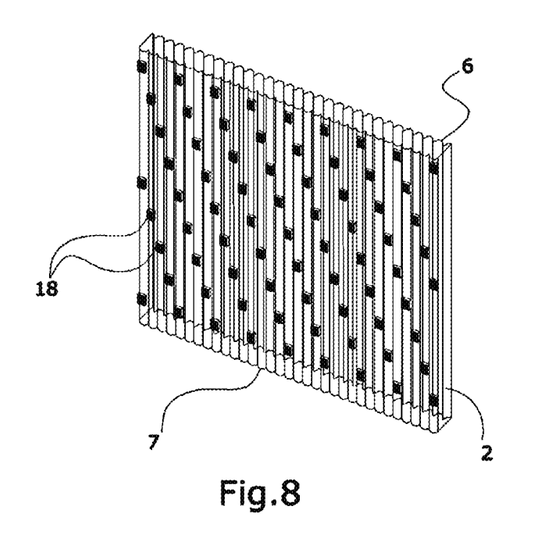
FIG. 8 shows the optical film with adhesive layer in a regular pattern.

FIG. 8 shows the optically transparent film 2, which from the side of the second array 5 (not shown in FIG. 8) of positive microlenses 7 on the surface has adhesive elements 18 applied in a regular pattern, the total coating area of which does not exceed 25% of the surface area of the optical film 2.

Example 13

Figure 9:
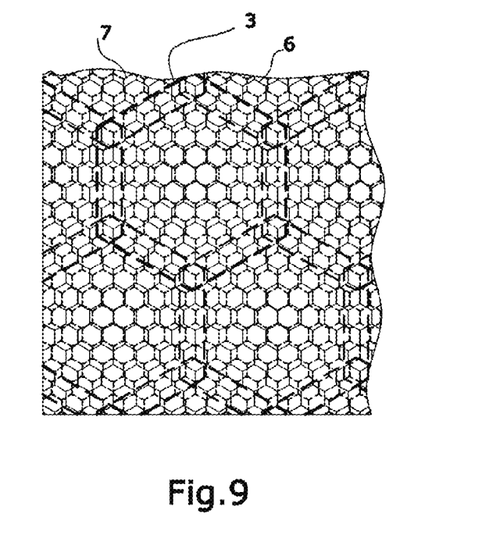
FIG. 9 shows the optical film for implementing the method for reconstruction of a multi-view image and comprising two arrays of positive hexagonal microlenses forming the hexagonal superlenses.

FIG. 9 shows a fragment of the optical film 2, which comprises 2D arrays 4,5 (not shown in FIG. 9) of hexagonal positive microlenses 6,7 forming a fly-eye structure of superlenses 3 of hexagonal form. The optical film 2 may be manufactured with the same alignment of arrays 4,5 of microlenses 6,7 and additional layers 16,17,18, as in any of the embodiments described in Examples 7(a-g). The optical film 2 may be manufactured with the same alignment of arrays 4,5 of microlenses 6,7 and additional layers 16,17,18, as in any of the embodiments described in Examples 7(a-g).

Example 14

Figure 10:
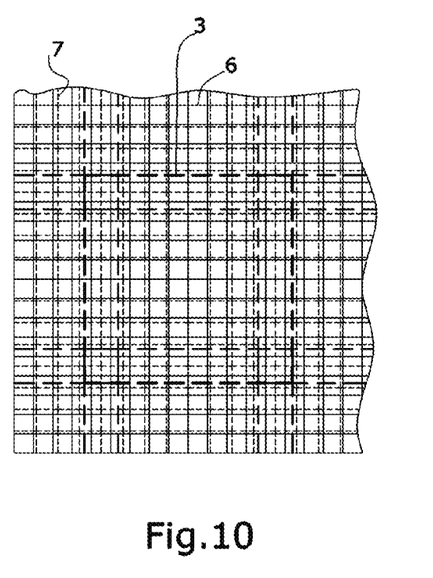
FIG. 10 shows the optical film for implementing the method for reconstruction of a multi-view image and comprising two arrays of positive square microlenses forming the square superlenses.

FIG. 10 shows a fragment of the optical film 2, which comprises 2D arrays 4,5 (not shown in FIG. 10) of square positive microlenses 6,7 forming a fly-eye structure of superlenses 3 of square form. The optical film 2 may be manufactured with the same alignment of arrays 4,5 of microlenses 6,7 and additional layers 16,17,18, as in any of the embodiments described in Examples 7(a-g).

Example 15

Figure 11:
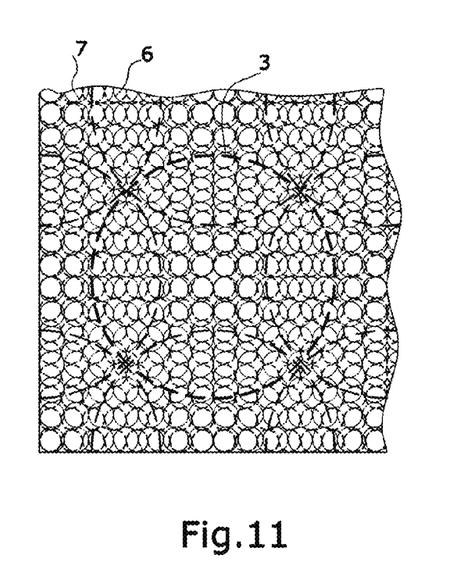
FIG. 11 shows the optical film for implementing the method for reconstruction of a multi-view image and comprising two arrays of positive circular microlenses forming the circular superlenses.

FIG. 11 shows a fragment of the optical film 2, which comprises 2D arrays 4,5 (not shown in FIG. 11) of circular positive microlenses 6,7 forming a fly-eye structure of superlenses 3 of circular form. The optical film 2 may be manufactured with the same alignment of arrays 4,5 of microlenses 6,7 and additional layers 16,17,18, as in any of the embodiments described in Examples 7(a-g).

The proposed method allows increasing elemental image pitch up to 2 inches without increasing the thickness of optical film and decreasing the visual quality of a multi-view image. This allows decreasing the consumption of the optical material when manufacturing the optical film and simplifying the process of placing thereof relative to the array of elemental images, and also provides the possibility of rather simple placing within the distance from the optical film equal to two focal distances of superlenses of the optical film, additional arrays of elemental images in the form of transparent films, liquid crystal displays and other displays. The proposed method allows obtaining both static and dynamic multi-view image of a view or an object with actually any depth of field (i.e. highly realistic images of real or virtual object or views with depth of field up to several meters). The proposed method makes possible obtaining qualitative large-format multi-view images with the use of elemental image arrays obtained by common printers of low and medium resolution (70-600 points per inch). It is crucially important for obtaining multi-view images of a large format with the use of prefabricated constructions, such as glass units, signboards, light boxes, etc. The use of microlens arrays with the number of microlenses per inch from 100 and more in the optical film makes microlens element practically unnoticeable for a viewer that is necessary for comfortable viewing a multi-view image from a close distance.

The invention claimed is:
1. A device for producing a 3D multi-view image (1), comprising:
an optical film (2) comprising an array of superlenses (3), each of the superlenses within the array of superlenses (3) being formed by a plurality of positive microlenses (6) which are part of a first array (4) of positive microlenses (6) and a plurality of positive microlenses (7) which are part of a second array (5) of positive microlenses (7), the first array (4) of positive microlenses (6) being fixedly arranged and oriented identically relative to the second array (5) of positive microlenses (7), the superlenses (3) having a focal plane (9) at a focal distance (f) from the optical film (2), wherein the optical film (2) has a thickness between 0.5 and 30 mil,
wherein along at least one direction of its surface the optical film (2) comprises between 0.5 and 225 superlenses (3) per inch,
wherein the first array (4) of positive microlenses (6) comprises between 100 and 2250 microlenses (6) per inch,
wherein the second array (5) of positive microlenses (7) comprises at least 0.5 more positive microlenses (7) per inch than the first array (4) and less than 10% more positive microlenses (7) per inch than the first array (4), and
wherein an aperture angle α of the positive microlenses (7) of the second array (5) of positive microlenses (7) is not less than 7°; and
an array (10) of static or dynamic elemental images arranged parallel to the optical film (2) in the focal plane (9) or at a distance from the focal plane (9) that is less than the focal distance (f) of the superlenses (3), wherein the arrangement and spacing of elemental images per inch corresponds to the arrangement and spacing of superlenses (3) per inch in the same direction;
wherein the device is structured to produce a 3D multi-view image.
2. The device according to claim 1, further comprising
at least one additional array (12) of static or dynamic elemental images disposed on an at least partially optically transparent medium (13) which is arranged between the optical film (2) and the array (10) of static or dynamic elemental images,
wherein the arrangement and spacing of elemental images per inch corresponds to the arrangement and spacing of superlenses (3) per inch in the same direction.
3. The device according to claim 1, wherein the optical film (2) is placed on an optically transparent substrate with a thickness between 0.005 and 7 inches.
4. The device according to claim 1,
wherein an aperture angle β of the positive microlenses (6) of the first array (4) of positive microlenses (6) is greater than the aperture angle α of the positive microlenses (7) of the second array (5) of positive microlenses (7), and
wherein the aperture angle α and the aperture angle β are selected such that $\beta = a\alpha^2 + b$, with $0.06 \leq a \leq 0.08$ and $11 \leq b \leq 15$.
5. The device according to claim 1,
wherein the first array (4) of positive microlenses (6) comprises between 200 and 500 microlenses (6) per inch in at least one direction.
6. The device according to claim 1 wherein the positive microlenses (6,7) of at least one array (4,5) of positive microlenses (6,7) comprise an aspherical refraction surface.
7. The device according to claim 1, wherein at least one array (4,5) of positive microlenses (6,7) is made of an optically transparent material and comprises a flat side which forms an outward facing surface of the optical film (2).

8. The device according to claim 1,
further comprising a coating layer of an optically transparent material (16), applied onto at least one array (4,5) of positive microlenses (6,7),
wherein the difference between the refractive index of the material of the optical film (2) and the refractive index of the optical material of the coating layer (16) is not less than 0.15, and
wherein the coating layer forms a smooth surface of at least one side of the optical film (2).

9. The device according to claim 1, wherein the first array (4) of positive microlenses (6) and the second array (5) of positive microlenses (7) comprise positive lenticular microlenses.

10. The device according to claim 1, wherein the first array (4) is a 2D array of positive microlenses (6) and the second array (5) is a 2D array of positive microlenses (7) forming a fly-eye structure.

11. The device according to claim 1, wherein the optical film (2) is self-adhesive.

12. The device according to claim 11, wherein adhesive elements (18) made of an optically transparent substrate are disposed in a regular pattern on a surface of the optical film (2), and wherein a collective surface area of the adhesive elements (18) does not exceed 25% of the surface area of the optical film (2).

13. An autostereoscopic display comprising the device of claim 1.

14. A method for producing a 3D multi-view image (1), comprising:
providing an optical film (2) having a thickness between 0.5 and 30 mil and comprising an array of superlenses (3), the superlenses (3) being formed by a first array (4) of positive microlenses (6) which is fixedly arranged relative to a second array (5) of positive microlenses (7) and having a focal plane (9) at a focal distance (f) from the optical film (2),
wherein each of the superlenses within the array of superlenses (3) is formed by a plurality of positive microlenses (6) which are part of the first array (4) of positive microlenses (6) and a plurality of positive microlenses (7) which are part of the second array (5) of positive microlenses (7),
wherein along at least one direction of its surface the optical film (2) comprises between 0.5 and 225 superlenses (3) per inch,
wherein the first array (4) of positive microlenses (6) comprises between 100 and 2250 microlenses (6) per inch,
wherein the second array (5) of positive microlenses (7) comprises at least 0.5 more positive microlenses (7) per inch than the first array (4) and less than 10% more positive microlenses (7) per inch than the first array (4); and
placing an array (10) of static or dynamic elemental images parallel to the optical film (2) in the focal plane (9) or at a distance from the focal plane (9) that is less than the focal distance (f),
wherein the arrangement and spacing of elemental images per inch corresponds to the arrangement and spacing of superlenses (3) per inch in the same direction;
wherein the method produces a 3D multi-view image.

15. A method to display an autostereoscopic image comprising the method of claim 14.

16. The method as in claim 14, further comprising:
providing at least one additional array (12) of static or dynamic elemental images disposed on an at least partially optically transparent medium (13) and
arranging the at least one additional array (12) between the optical film (2) and the array (10) of static or dynamic elemental images.

* * * * *